(12) United States Patent
Katahira et al.

(10) Patent No.: US 7,824,818 B2
(45) Date of Patent: Nov. 2, 2010

(54) FUEL CELL STACK WITH WATER REMOVAL PROJECTIONS AT AIR OUTLETS

(75) Inventors: Kenichi Katahira, Tokyo (JP); Toshihiko Nonobe, Tokyo (JP); Kouji Mogi, Tokyo (JP)

(73) Assignee: Kabushiki Kaisha Equos Research, Tokyo (JP)

( * ) Notice: Subject to any disclaimer, the term of this patent is extended or adjusted under 35 U.S.C. 154(b) by 539 days.

(21) Appl. No.: 11/727,912

(22) Filed: Mar. 29, 2007

(65) Prior Publication Data

US 2007/0231670 A1 Oct. 4, 2007

(30) Foreign Application Priority Data

Mar. 31, 2006 (JP) .............................. 2006-097345

(51) Int. Cl.
*H01M 8/02* (2006.01)
*H01M 8/10* (2006.01)

(52) U.S. Cl. ...................................... 429/457; 429/524

(58) Field of Classification Search ................... 429/34, 429/35, 36, 37, 38, 39
See application file for complete search history.

(56) References Cited

U.S. PATENT DOCUMENTS 6,083,638 A * 7/2000 Taniguchi et al. ............. 429/34
2005/0164071 A1* 7/2005 Horiguchi .................... 429/38

FOREIGN PATENT DOCUMENTS

JP 2004-031175 1/2004

* cited by examiner

*Primary Examiner*—Dah-Wei D Yuan
*Assistant Examiner*—Stephan Essex
(74) *Attorney, Agent, or Firm*—Bacon & Thomas, PLLC

(57) ABSTRACT

In a fuel cell stack that is made by stacking unit cells in alternation with separators, lower edges of collector members that are in contact with oxygen electrodes of the unit cells project downward, providing projecting portions that project below lower edges of frames. Water-repellent regions are provided on lower edges of the projecting portions, facilitating shedding of water from the projecting portions.

11 Claims, 12 Drawing Sheets

FUEL CELL STACK WITH WATER REMOVAL PROJECTIONS AT AIR OUTLETS

INCORPORATION BY REFERENCE

The disclosure of Japanese Patent Application No. 2006-097345 filed on Mar. 31, 2006, including the specification, drawings and abstract is incorporated herein by reference in its entirety.

BACKGROUND OF THE INVENTION

1. Field of the Invention

The present invention relates to a fuel cell stack, specifically a fuel cell stack having a structure to discharge supplied water.

2. Description of the Related Art

In a conventional fuel cell that uses a polymer electrolyte membrane, a fuel chamber and an oxygen chamber sandwich the electrolyte membrane from opposite sides. A fuel gas in the fuel chamber is ionized through a fuel electrode, or an oxidizing gas (mainly oxygen in air) in the oxygen chamber is ionized through an oxygen electrode, and the ions are drawn through the electrolyte membrane to obtain electric power.

As shown in Japanese Patent Application Publication No. JP-A-2004-031175 (reference numerals 95, 951 in FIG. 4), after electric power is obtained, the oxidizing gas is discharged from the oxygen chamber to an exhaust chamber. Also, when the oxidizing gas flows into the oxygen chamber, coolant water is injected into the oxygen chamber from a water tank. Because the coolant water is injected into the oxygen chamber in this manner, the injected water arrives in the exhaust chamber through the oxygen chamber. The coolant water also functions to maintain the electrolyte membrane in a moist state. To maintain all of the electrolyte membranes that make up a fuel cell stack in a moist state, the oxygen and the water must be supplied uniformly to each of the stacked electrolyte membranes.

However, when the coolant water that is supplied to the oxygen chamber drops from an air flow passage 95, a water droplet forms at an opening 951, then falls after growing to a size that can drip. There is concern that a water droplet that accumulates at the opening 951 might obstruct air flow in the air flow passage 95, thereby reducing the cooling action.

SUMMARY OF THE INVENTION

In light of the facts described above, the present invention provides a fuel cell stack that improves air flow by promoting discharge of coolant water.

The present invention, which solves the problems described above, has structures as described below.

(1) In the fuel cell stack, unit cells, each of which is made up of an electrolyte layer plus a fuel electrode and an oxygen electrode that are provided on opposite sides of the electrolyte layer, are stacked such that they sandwich a separator to form, between the oxygen electrodes, an oxidizing gas chamber to which a mixed flow of air and water is supplied. The oxidizing gas chamber has an inlet port in an upper portion for the mixed flow and an outlet port in a lower portion for the mixed flow. The outlet port has a projecting portion that causes water droplets that accumulate on a wall surface of the oxidizing gas chamber to fall off.

(2) In the fuel cell stack described in (1) above, the separator has a collector member that is in contact with the oxygen electrode, and the projecting portion is formed by extending the collector member downward.

(3) In the fuel cell stack described in (1) above, the separator has a collector member that is in contact with the oxygen electrode, a collector member that is in contact with the fuel electrode, and a partition that is interposed between the collector members. The projecting portion is formed by extending the partition downward.

(4) In the fuel cell stack described in (1) above, the projecting portion is formed by extending the oxygen electrode downward.

(5) In the fuel cell stack described in any one of (1) to (4) above, the projecting portion has a slanting portion in which a lower edge of the projecting portion is slanted.

(6) In the fuel cell stack described in any one of (1) to (5) above, a water-repellent treatment is applied to a lower edge of the projecting portion.

According to a first aspect of the present invention, water that is taken in through the inlet port along with air runs down the projecting portion from the outlet port and falls off, so water droplets do not obstruct the outlet port, and air flows through without any delay.

According to a second aspect of the present invention, the collector member that forms the separator on the oxygen electrode side projects downward, so the projecting portion that is provided has a surface that is continuous with an inner wall surface of the oxidizing gas chamber, making it easy for water droplets to pass out of the oxidizing gas chamber and fall off.

According to a third aspect of the present invention, a portion of the partition forms the projecting portion, so it is not necessary to provide a separate projecting portion, thereby making assembly easier.

According to a fourth aspect of the present invention, the oxygen electrode, which makes up a portion of an interior wall of the oxidizing gas chamber, projects downward, so the projecting portion that is provided has a surface that continues a surface of the oxygen electrode as a single surface, making it easy for water droplets to run down and fall off.

According to a fifth aspect of the present invention, the lower edge of the projecting portion is slanted, so water droplets grow as they run along the slanting edge and fall off, further facilitating the shedding of the water droplets.

According to a sixth aspect of the present invention, a water-repellent treatment is applied to the lower edge of the projecting portion, so water droplets that reach the lower edge detach easily from the projecting portion.

DETAILED DESCRIPTION OF THE PREFERRED EMBODIMENTS

Figure 1:
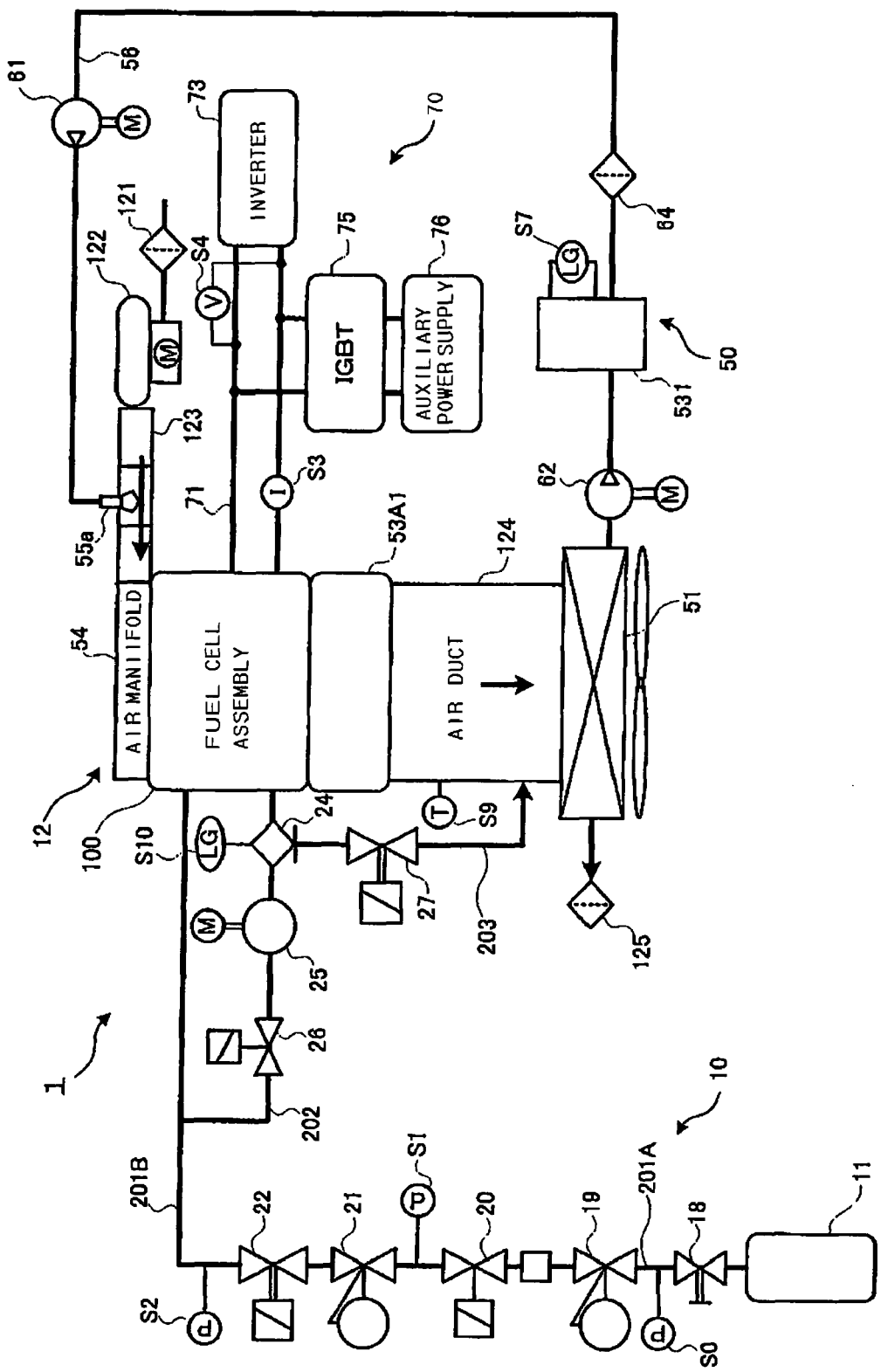
FIG. 1 is a block diagram that shows a fuel cell system 1 according to the present invention.

A preferred embodiment of the present invention will be explained below with reference to the drawings. This embodiment is a fuel cell system that is installed in an electric automobile. FIG. 1 is a block diagram that shows the structure of the fuel cell system 1 according to the present invention. As shown in FIG. 1, the fuel cell system 1 is mainly structured from a fuel cell stack 100, a fuel supply system 10, which includes a hydrogen storage tank 11, an air supply system 12, a water supply system 50, and a load system 70.

Figure 2:
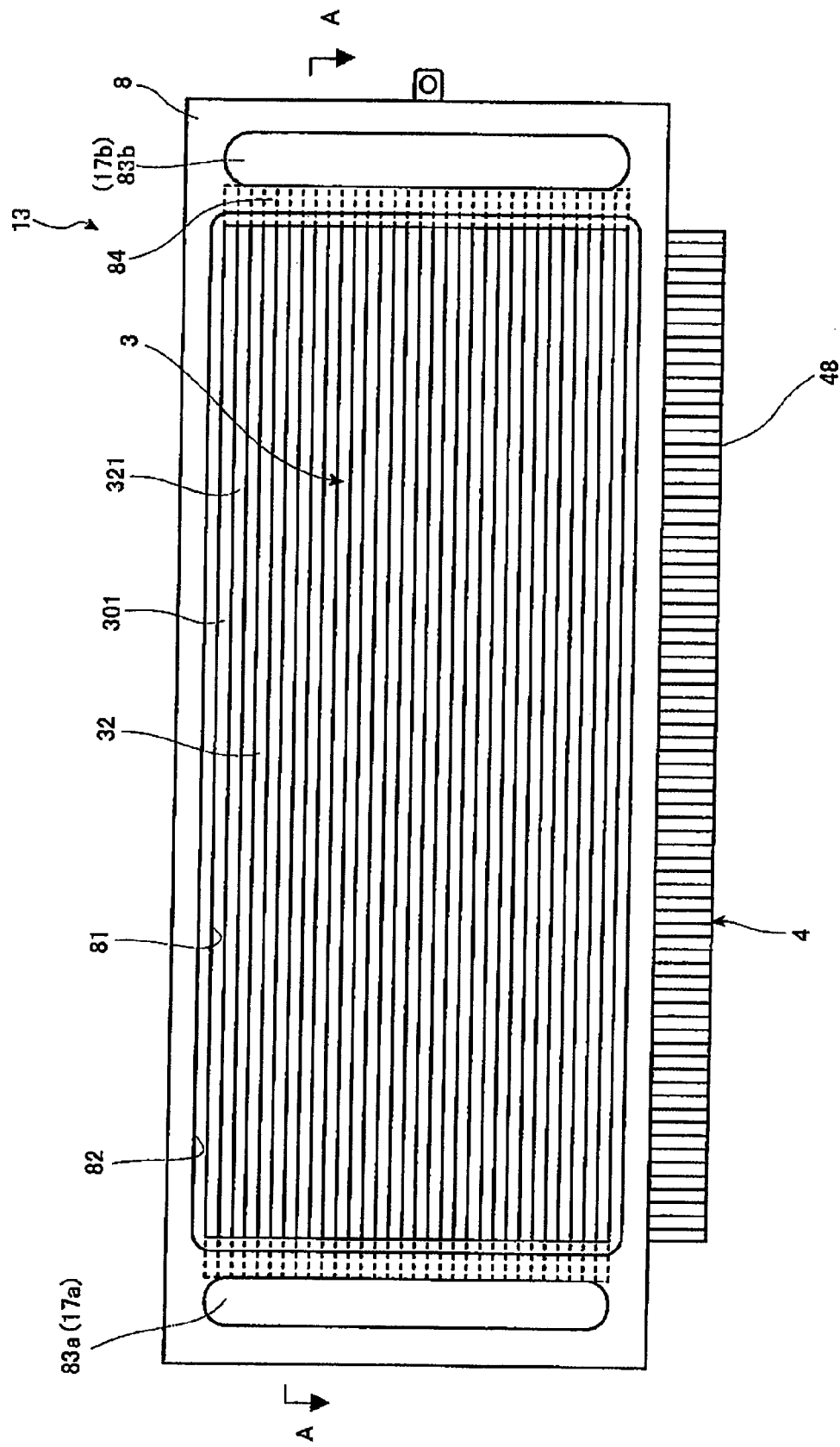
FIG. 2 is an overall front view that shows a fuel cell separator.
Figure 3:
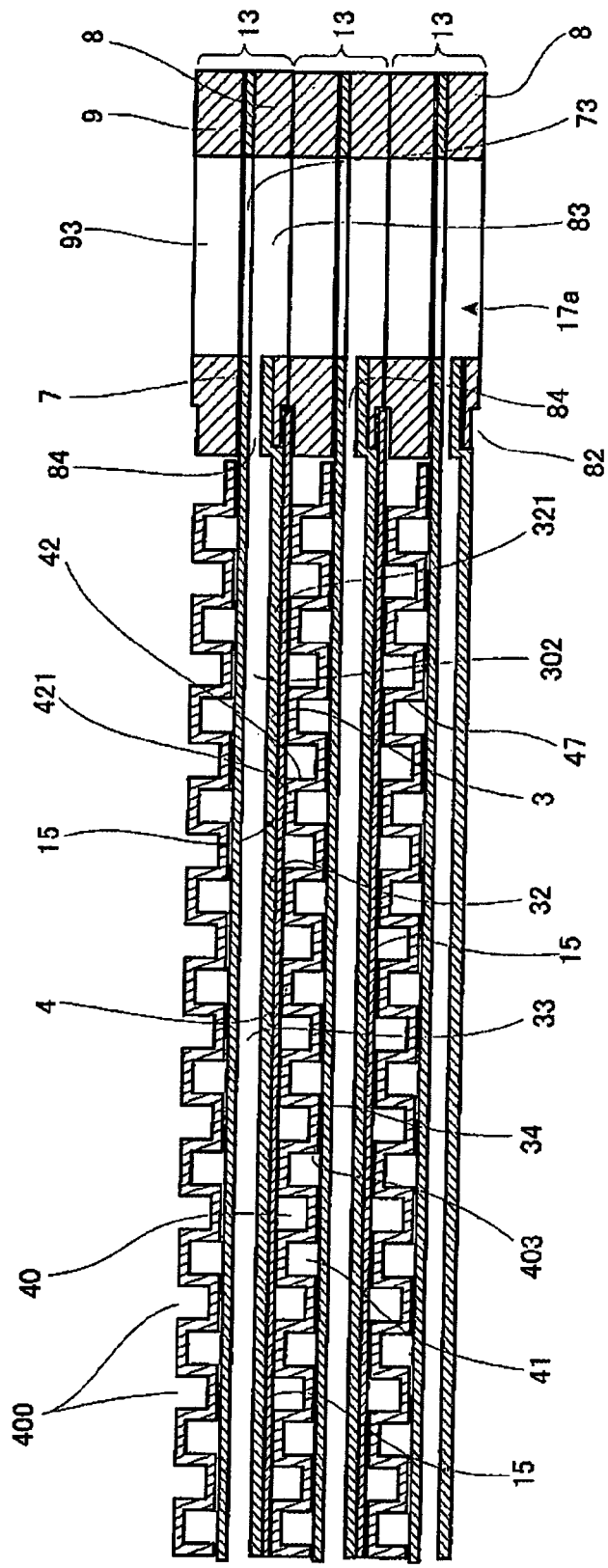
FIG. 3 is a partial sectional plan view (A-A sectional view) of a fuel cell stack structured from the fuel cell separators.
Figure 4:
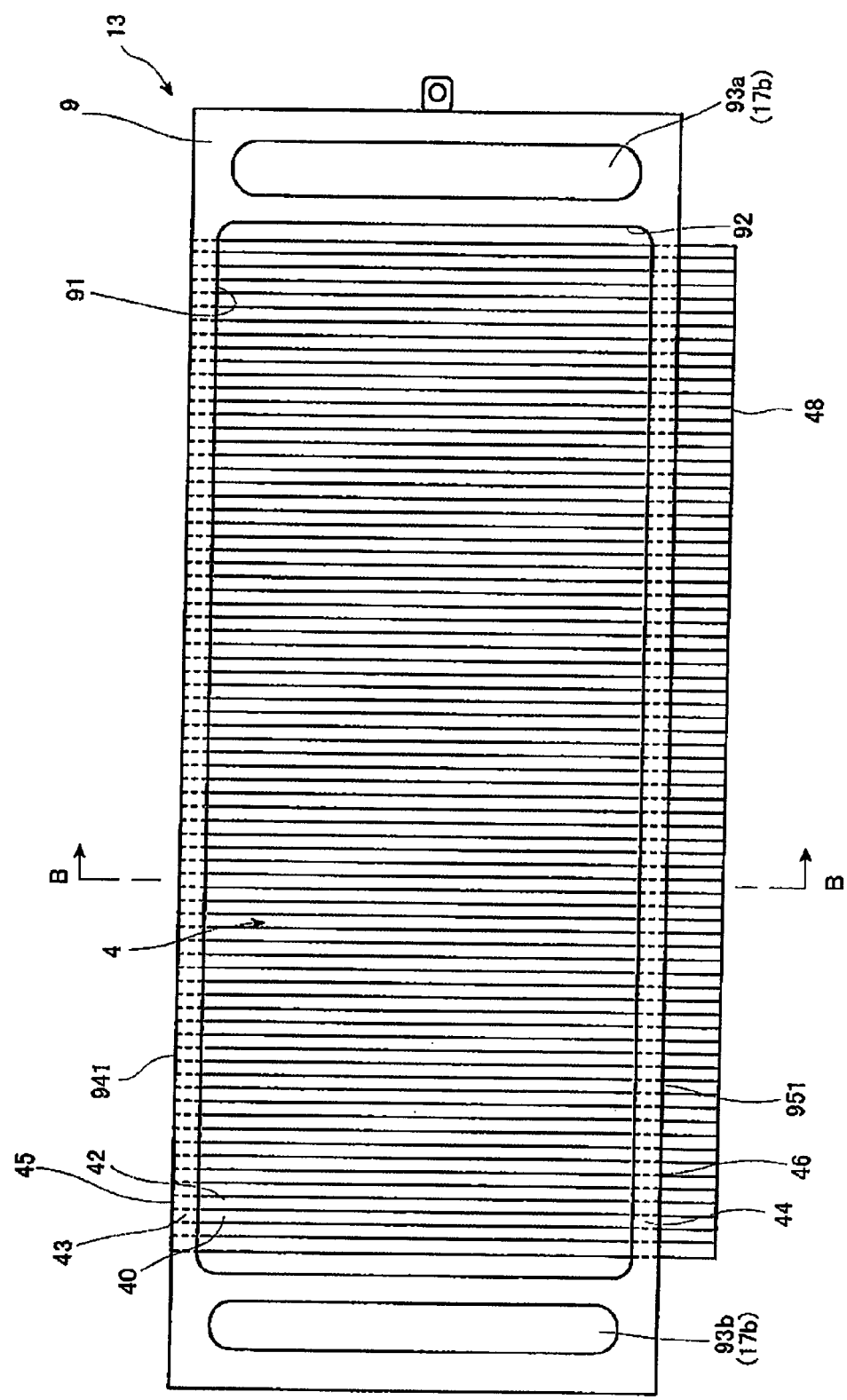
FIG. 4 is an overall rear view of the fuel cell separator.
Figure 5:
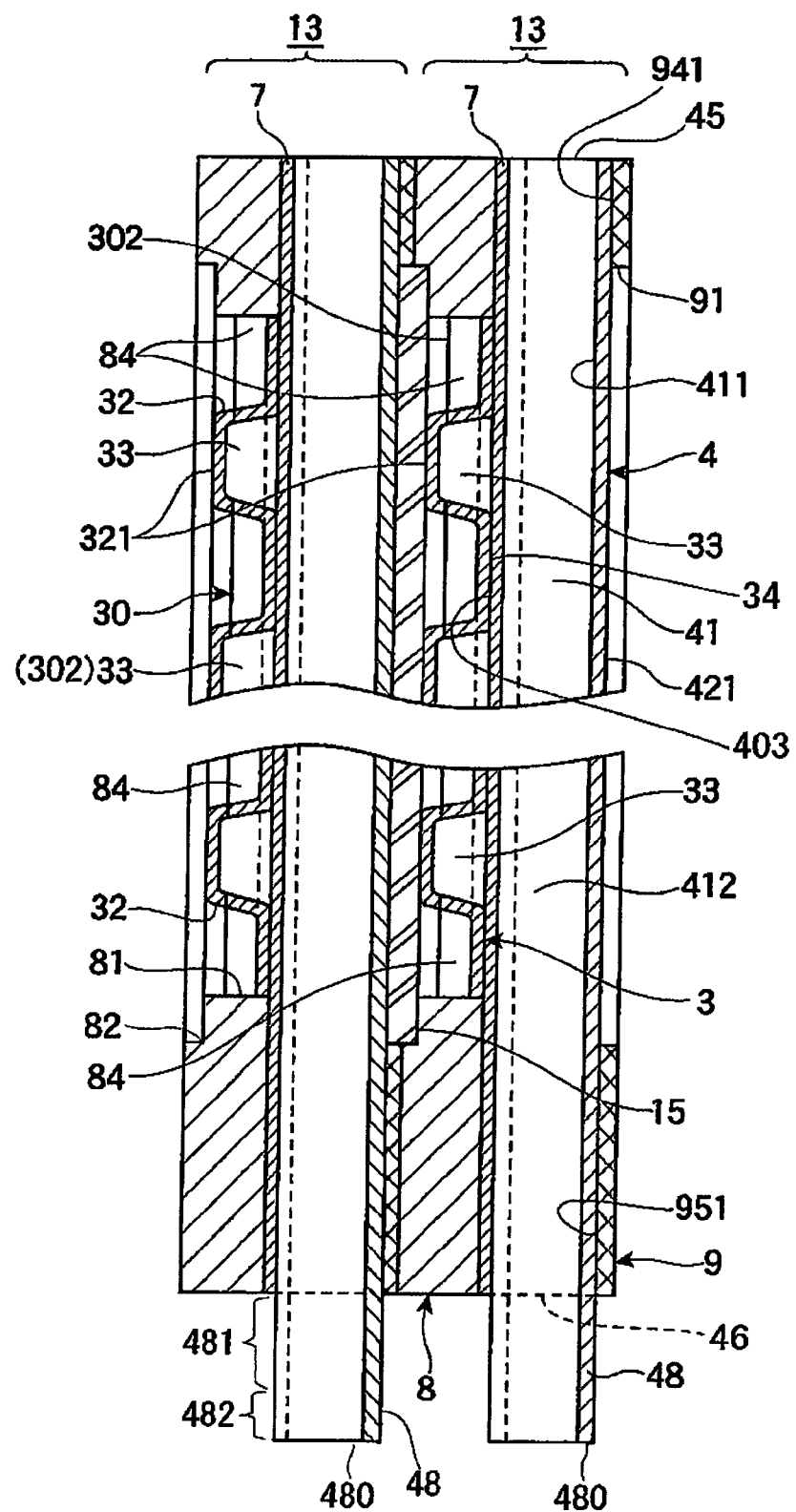
FIG. 5 is a partial sectional plan view (B-B sectional view) of the fuel cell separator.
Figure 6:
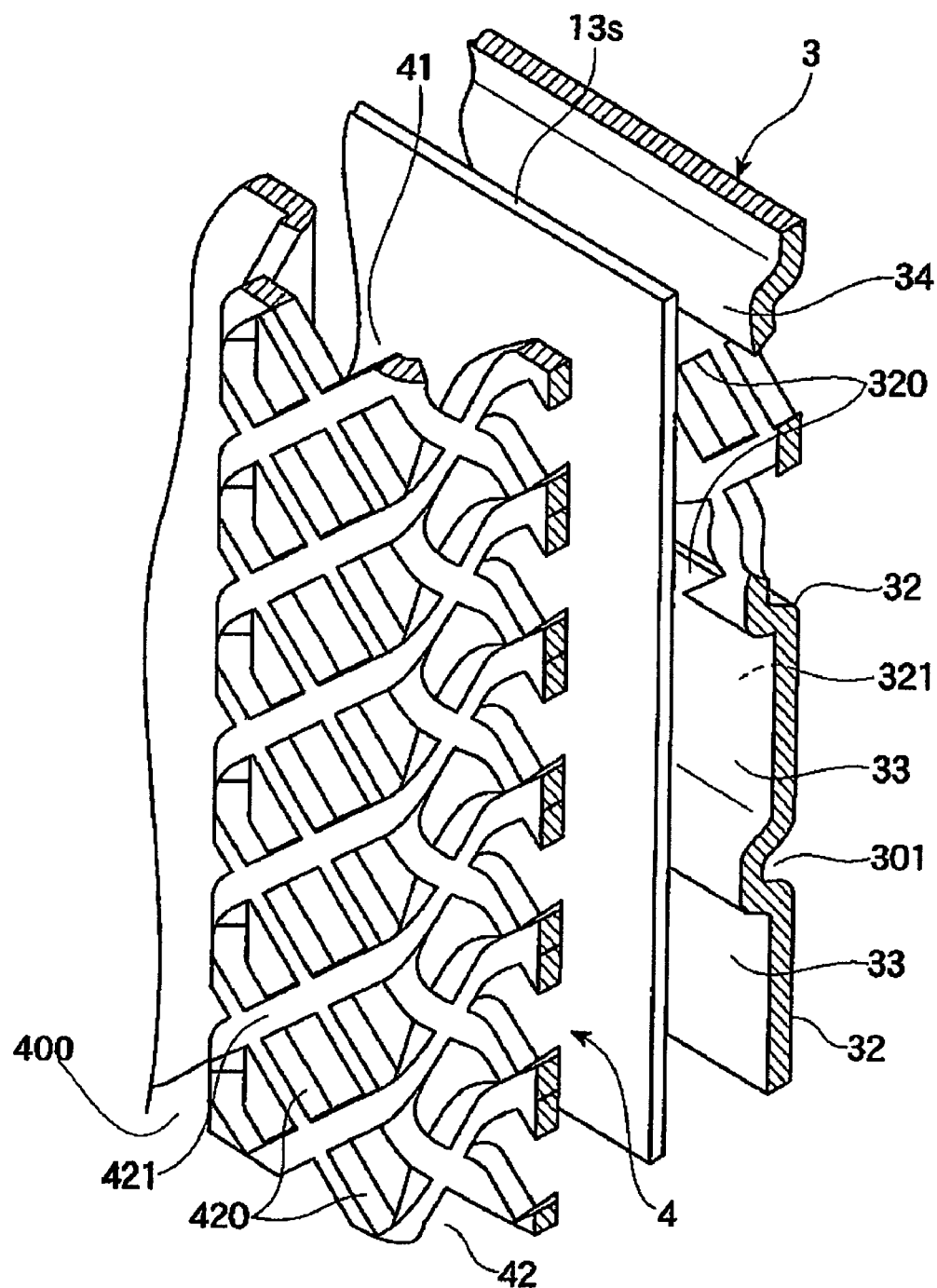
FIG. 6 is an enlarged partial oblique view that shows a positional relationship of a collector member and a partition.

The structure of the fuel cell stack 100 will be explained. FIG. 2 is an overall front view that shows a fuel cell separator 13. FIG. 3 is a partial sectional plan view (A-A sectional view in FIG. 2) of the fuel cell stack 100, which is structured from the fuel cell separators 13. FIG. 4 is an overall rear view of the fuel cell separator 13. FIG. 5 is an enlarged partial sectional plan view (B-B sectional view in FIG. 4) of the fuel cell separators 13. FIG. 6 is an enlarged partial oblique view that shows a positional relationship of collector members 3, 4 and a partition 13s.

The fuel cell stack 100 is structured from alternating layers of fuel cell unit cells 15 and the fuel cell separators 13. Each separator 13 includes collector members 3, 4, frames 8, 9, and the partition 13s. The collector members 3, 4 contact electrodes of the unit cell 15 and draw electric current to the outside. The frames 8, 9 are mounted around the perimeter edges of the collector members 3, 4. The partition 13s is interposed between the collector members 3, 4. The partition 13s prevents direct contact (mixing) of a fuel gas and an oxidizing gas. The partition 13s and the collector members 3, 4, which are collector plates, are structured from metal. The structural metals of the collector members 3, 4 and the partition 13s are conductive, corrosion-resistant metals and may, for example, be stainless steel, nickel alloy, titanium alloy, or the like that has been treated by a corrosion-resistant, electrically conductive process. The corrosion-resistant, electrically conductive process may, for example, be metal plating or the like. The collector member 3 contacts a fuel electrode of the unit cell 15, and the collector member 4 contacts an oxygen electrode. A plurality of convex portions 32, which are shaped to protrude, are formed on the collector member 3 by a stamping process.

The convex portions 32 are disposed at equal intervals along a long side of a sheet and face in the direction of a short side of the sheet. Hydrogen flow channels 301 are formed between the convex portions 32 by grooves that are formed between the convex portions 32, which are disposed along the long side of the sheet (the lateral direction in FIG. 2). As shown in FIG. 3, hydrogen flow channels 302 are formed by grooves 33, which are formed on the reverse sides of the convex portions 32. The faces of the top portions of the convex portions 32 serve as contact portions 321, which contact the fuel electrode. The collector member 3 is a mesh, so the fuel gas can be supplied to the fuel electrode through holes 320, even in portions where the contact portions 321 contact the fuel electrode. Also, as shown in FIG. 6, the hydrogen gas can flow in both directions between the hydrogen flow channels 301 and the hydrogen flow channels 302 through the holes 320. Each end portion of the collector member 3 extends to one of two hydrogen supply channels (17a or 17b) that are formed when the separators 13 are stacked.

A plurality of convex portions 42 are formed on the collector member 4 by a stamping process. The convex portions 42 are formed in a continuous straight line parallel to the short side of the sheet and are disposed at equal intervals. Grooves are formed between the convex portions 42, forming air flow channels 40, in which air flows. The faces of the top portions of the convex portions 42 serve as contact portions 421, which contact the oxygen electrode. As shown in FIG. 6, the collector member 4 is a mesh, so the oxidizing gas (oxygen in the air) can be supplied through holes 420, even in portions where the contact portions 421 contact the oxygen electrode. Also, groove-shaped hollow portions 41 are formed on the reverse sides of the convex portions 42.

The collector members 3, 4 are stacked together and fastened such that each convex portion 32 and each convex portion 42 is on an outer side. At this time, a reverse side face 34 of the collector member 3 and reverse side faces 403 of the air flow channels 40 are respectively in a state of contact with the obverse and reverse faces of the partition 13s, such that they are in a state in which electric current can flow in either direction. Also, as shown in FIG. 3, when the unit cells 15 are stacked, open portions 400 of the air flow channels 40 are closed off, such that the air flow channels 40 form tubular flow channels and a portion of the interior walls of each air flow channel 40 is made up of the oxygen electrode. Oxygen and water are supplied to the oxygen electrode of the unit cell 15 from the air flow channels 40. Oxygen and water are also supplied to the oxygen electrode of the unit cell 15 from the hollow portions 41 through the mesh of the collector member 4. The oxygen that is supplied to the oxygen electrode is the oxygen that is contained in the air that passes through the air flow channels 40 and the hollow portions 41.

The frame 9, described later, is superposed on the collector member 4. An upper end of the collector member 4 reaches an upper end of the frame 9, and a lower end of the collector member 4 projects beyond the frame 9 to form a projecting portion 48.

An opening at the upper end of each air flow channel 40 serves as an inlet port 43 through which air and water flow into each air flow channel 40, and an opening at the other end serves as an outlet port 44 through which air and water flow out of each air flow channel 40. Also, an opening at one end of each hollow portion 41 serves as an inflow opening 45 through which air and water flow into each hollow portion 41, and an opening at the other end serves as an outflow opening 46 through which air and water flow out of each hollow portion 41. In the structure as described above, the air flow channels 40 and the hollow portions 41 are arranged such that they alternate and are parallel, forming a structure in which they are adjacent to one another, with side walls 47 between them. The air flow channels 40 from the inlet ports 43 to the outlet ports 44, and the hollow portions 41 from the inflow openings 45 to the outflow openings 46, individually as well as collectively, function as an oxygen chamber (oxidizing gas chamber) that supplies oxygen to a solid electrolyte membrane.

Vent holes 73a, 73b are formed at both ends of the partition 13s. Long sides of the vent holes 73a, 73b are of the same length as the short sides of the collector member 3. Vent holes 73a, 73b form the hydrogen supply channels (17a or 17b).

The frames 8, 9 are respectively superposed on the collector members 3, 4. As shown in FIG. 2, the frame 8, which is superposed on the collector member 3, is built to the same size as the partition 13s. A window 81, which accommodates the collector member 3, is formed in the center of the frame 8. Also, holes 83 are formed near both ends of the frame 8 in positions that align with the vent holes 73a,73b of the partition 13s. Concave portions that accommodate the collector member 3 are formed in the frame 8 between the window 81 and holes 83a, 83b. Hydrogen flow passages 84 are also provided in the frame 8. Also, a concave portion is formed on the opposite face of the frame 8 from the face that contacts the collector member 3, and the outline of the concave portion matches that of the window 81. The concave portion is provided with an accommodating portion 82 that accommodates the unit cell 15. A fuel chamber 30 is formed by the window 81, the fuel electrode surface of the unit cell 15 that is accommodated by the accommodating portion 82, and the plurality of alternatingly disposed hydrogen flow channels 301, 302. In this manner, the fuel chamber is provided adjacent to the fuel electrode, and the oxygen chamber is provided adjacent to the oxygen electrode.

The frame 9, which is superposed on the collector member 4, is built to the same size as the frame 8 and the partition 13s. A window 91, which accommodates the collector member 4, is formed in the center of the frame 9. Also, holes 93a, 93b are formed near the ends of the frame 9 in positions that align with the vent holes 73a,73b of the partition 13s.

Figure 7:
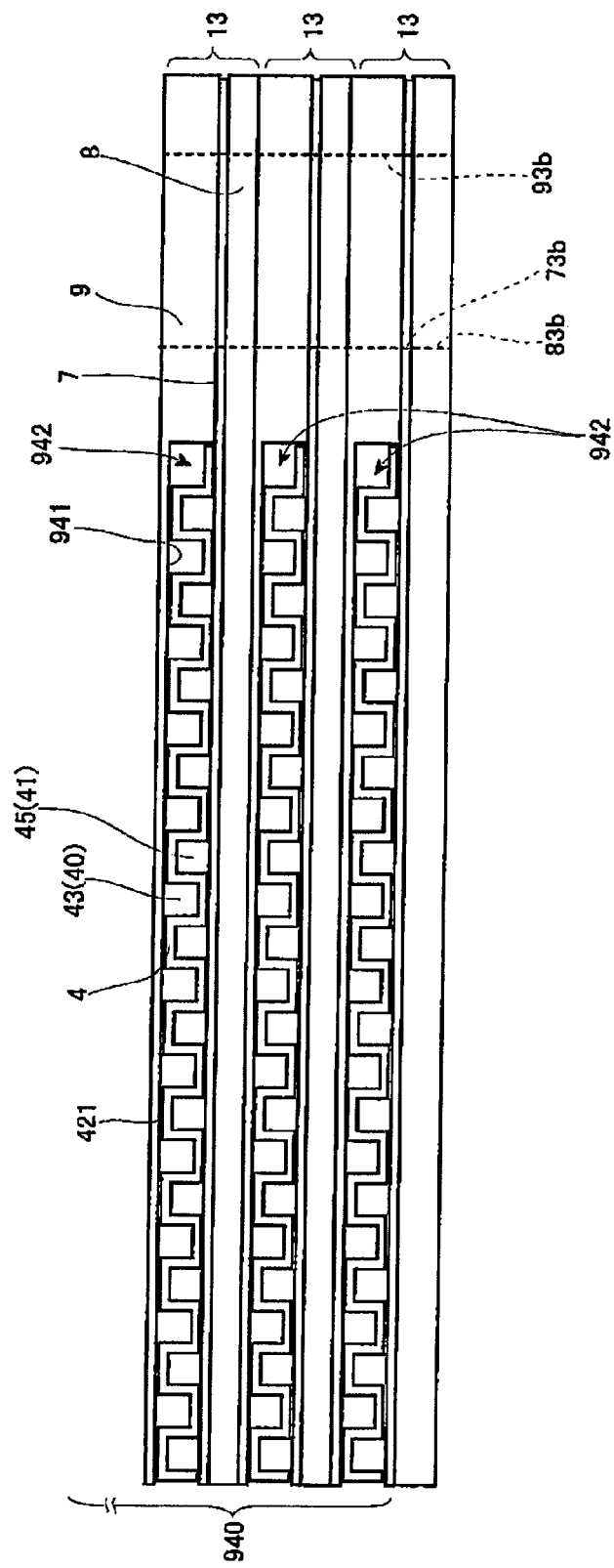
FIG. 7 is a partial plan view that shows a structure of a top face of the fuel cell stack.

FIG. 7 is an enlarged partial plan view of the fuel cell stack 100. Grooves 941, 951 (refer to FIGS. 5 and 7) are formed along the opposing long sides of the frame 9 on the face of the frame 9 on the side that is superposed on the collector member 4. The upper and lower end portions of the collector member 4 are accommodated within the grooves 941, 951. Passages formed by the grooves 941, 951 and the collector member 4 are continuous with the oxygen chamber.

Also, a concave portion is formed on the opposite face of the frame 9 from the face that contacts the collector member 4, and the outline of the concave portion matches that of the window 91. The concave portion is provided with an accommodating portion 92 that accommodates the unit cell 15. Rectangular openings 940 are formed in the top face of the fuel cell stack 100 by an assemblage of openings (air entry portions 942) of the grooves 941 on the upper end of the collector member 4. Air flows into the openings 940 from an air manifold 54.

Figure 8:
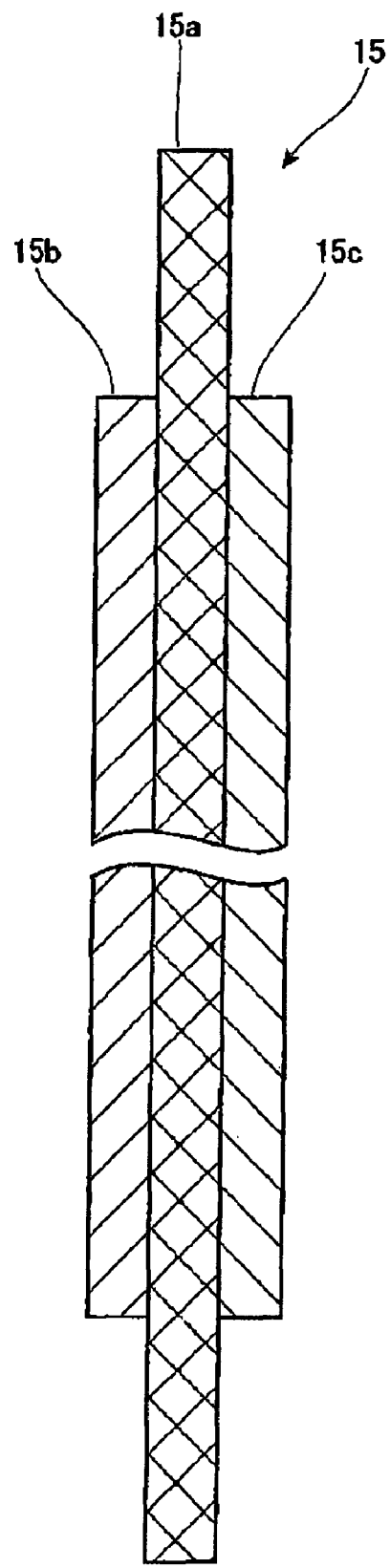
FIG. 8 is an enlarged side sectional view that shows a structure of a unit cell.

FIG. 8 is an enlarged sectional view of the unit cell 15. The unit cell 15 includes a solid polymer electrolyte membrane 15a, as well as an oxygen electrode 15b, which is an oxidizing electrode, and a fuel electrode 15c, which are superposed on opposite faces of the solid polymer electrolyte membrane 15a. The solid polymer electrolyte membrane 15a is sandwiched between the oxygen electrode 15b and the fuel electrode 15c. The solid polymer electrolyte membrane 15a is formed to a size that matches that of the accommodating portions 82, 92, and the oxygen electrode 15b and the fuel electrode 15c are formed to a size that matches that of the windows 81, 91. The thickness of the unit cell 15 is extremely thin compared to the thicknesses of the frames 8, 9 and the collector members 3, 4, so it is shown as a one-piece member in the drawings. The inner walls of the air flow channels 40 are given a hydrophilicization treatment. It is desirable for surface treatment to be carried out such that the contact angle of water on the inner wall surface is not greater than 40° and preferably not greater than 30°.

The treatment method is to apply a hydrophilicizing agent to the surface. The applied hydrophilicizing agent may be polyacrylamide, polyurethane resin, titanium dioxide ($TiO_2$), or the like. As shown in FIG. 5, the hydrophilicization treatment is applied to upper parts of the projecting portions 48, providing them with hydrophilicized regions 481. The hydrophilicized regions 481 of the projecting portions 48 are provided such that they are continuous with regions of the collector member 4 that are given the hydrophilicization treatment. The hydrophilicization treatment makes it possible for water droplets to be moved easily from the collector member 4 to the projecting portions 48. Also, water-repellent regions 482, which are given a water-repellent treatment, are provided at the lower ends of the projecting portions 48. The water-repellent treatment may be a Teflon process, a coating treatment with a silicon-based or fluorine-based water-repellent agent, or the like. The water-repellent regions 482 make it possible for water droplets that reach the lower ends of the projecting portions 48 to detach easily from the projecting portions 48.

The frames 8, 9, structured as described above, hold the collector members 3, 4 and make up the separators 13. The separators 13 are stacked alternately with the unit cells 15 to make the fuel cell stack 100. FIG. 7 is a partial plan view of the fuel cell stack 100. A plurality of the inlet ports 43 are open on the top face of the fuel cell stack 100. As described below, at the same time that air flows into the inlet ports 43 from the air manifold 54, water that is injected from a nozzle 55a inside the air manifold 54 flows into the inlet ports 43. The nozzle 55a supplies water to the fuel cell stack 100 in the form of liquid droplets (a spray). The air and the water in liquid droplet form that flow in from the inlet ports 43 cool the collector members 3, 4 by latent heat cooling. Also, a plurality of the outlet ports 44 are open on the bottom face of the fuel cell stack 100, in positions opposite the inlet ports 43 that are shown in FIG. 7. The air and injected water flow out through the outlet ports 44. That is, a plurality of the inlet ports 43 are open in a pattern of rows and columns on the top face of the fuel cell stack 100, and in the same manner, a plurality of the outlet ports 44 are open in a pattern of rows and columns on the bottom face of the fuel cell stack 100.

Figure 9:
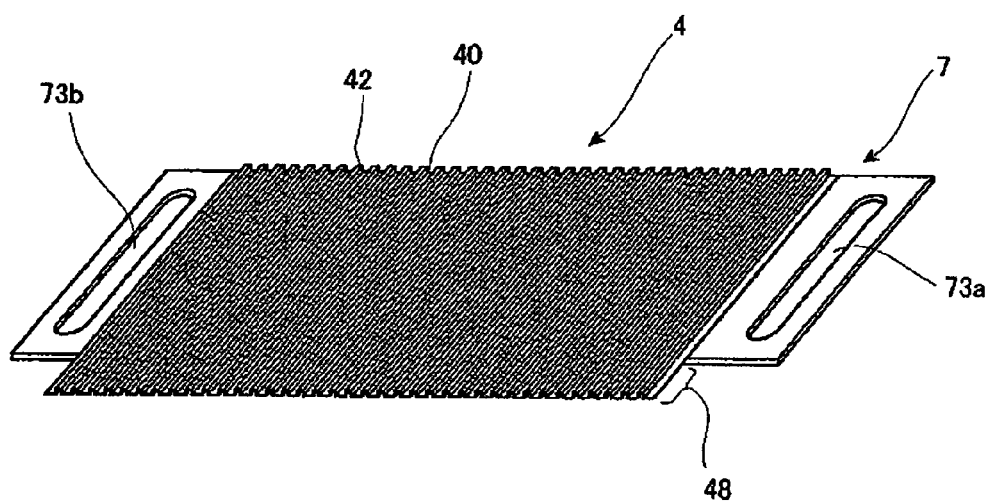
FIG. 9 is an oblique view that shows an overall shape of the collector member.

The air entry portions 942 are formed by the inlet ports 43 and the inflow openings 45. Also, air discharge openings of the same shape as the air entry portions 942 are formed by the outlet ports 44 and the outflow openings 46. The projecting portions 48 project downward from the air discharge openings. FIG. 9 is an oblique view that shows the overall shape of the collector member 4. The grooves formed by the air flow channels 40 and the hollow portions 41 within the oxidizing gas chamber are formed such that they extend to the projecting portions 48. By extending the collector member 4 and forming the projecting portions 48 as parts of the collector member 4, the collector member 4 and the projecting portions 48 can be made continuous to facilitate the discharge of water droplets, and an increase in the number of parts can be contained.

Figure 10:
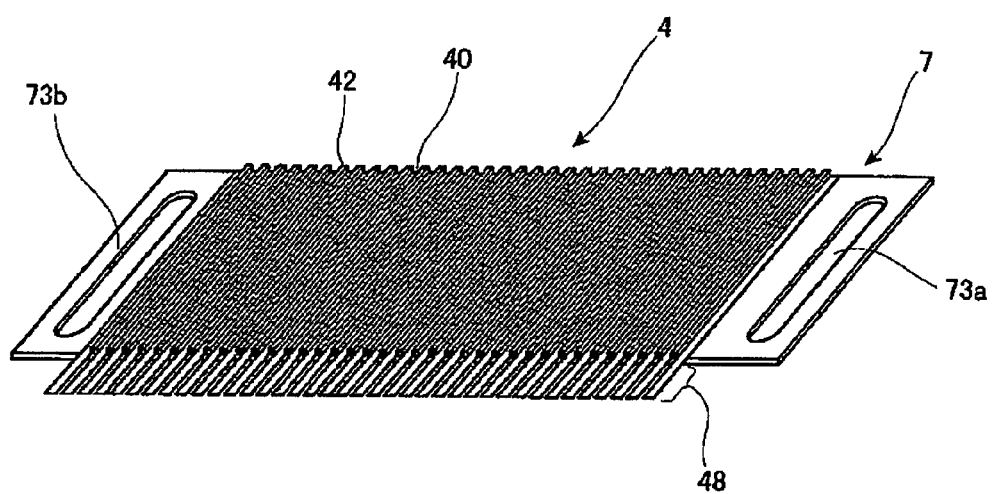
FIG. 10 is an oblique view that shows an overall shape of a collector member that shows a different structure.

FIGS. 10 to 15 are drawings that show examples of other structures for the projecting portions. As shown in FIG. 10, the projecting portions 48 that are provided on the collector member 4 are formed by the extension of the bottom portions of the grooves that make up the air flow channels 40. The projecting portions 48 are divided into narrow strip shapes, so that volume of water droplets that a single member can hold is reduced, making it possible to further promote the shedding of water droplets. Also, when the vehicle is inclined by an ascending slope, a descending slope, or the like, or when acceleration is applied during take-off and stopping, there is little effect on the action that promotes the shedding of the water. Note that the strip-shaped members may also be formed by extending the side walls 47 and the contact portions 421.

Figure 11:
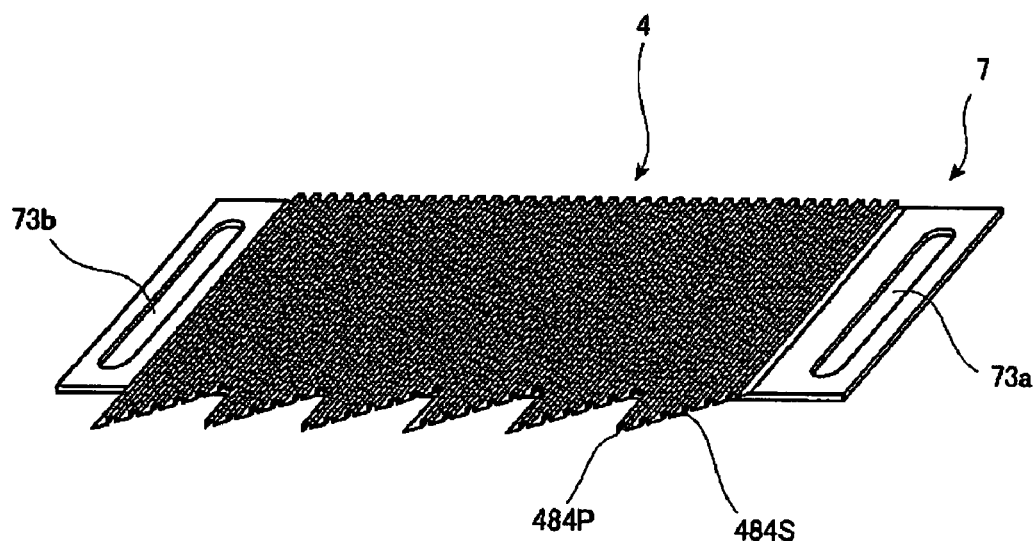
FIG. 11 is an oblique view that shows an overall shape of a collector member that shows a different structure.

FIG. 11 shows a structure that has slanting portions 484S on the lower ends of the projecting portions 48.

The lower ends of the slanting portions 484S are vertices 484P of acute angles, and because a plurality of the slanting portions 484S are provided, the overall appearance is a sawtooth shape. Because the lower ends of the slanting portions 484S form acute angles, water droplets fall readily from the vertices 484P. Also, when the vehicle is inclined by an ascending slope, a descending slope, or the like, or when acceleration is applied during take-off and stopping, there is little effect on the action that promotes the shedding of the water.

Figure 12:
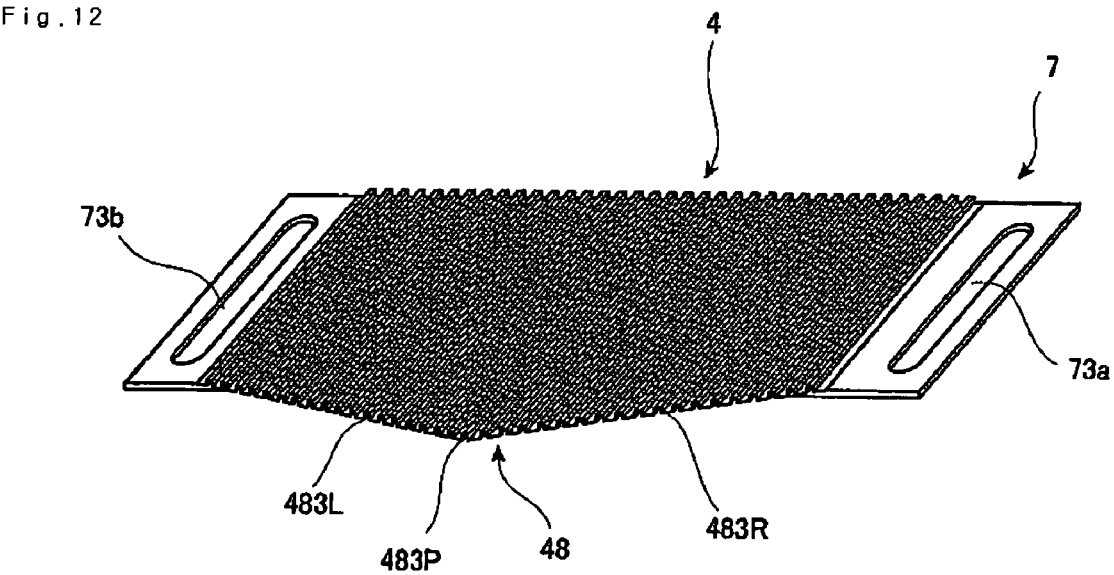
FIG. 12 is an oblique view that shows an overall shape of a collector member that shows a different structure.

In FIG. 12, the projecting portions 48 have slanting portions 483R, 483L, which slant downward toward the center, where the slanting portions 483R, 483L meet at a vertex 483P that is formed in an obtuse angle. Because the slanting portions 483R, 483L slant in two directions, water can be shed by running to either the right or left slanting portion 483R, 483L, no matter in which direction the vehicle is inclined.

Figure 13:
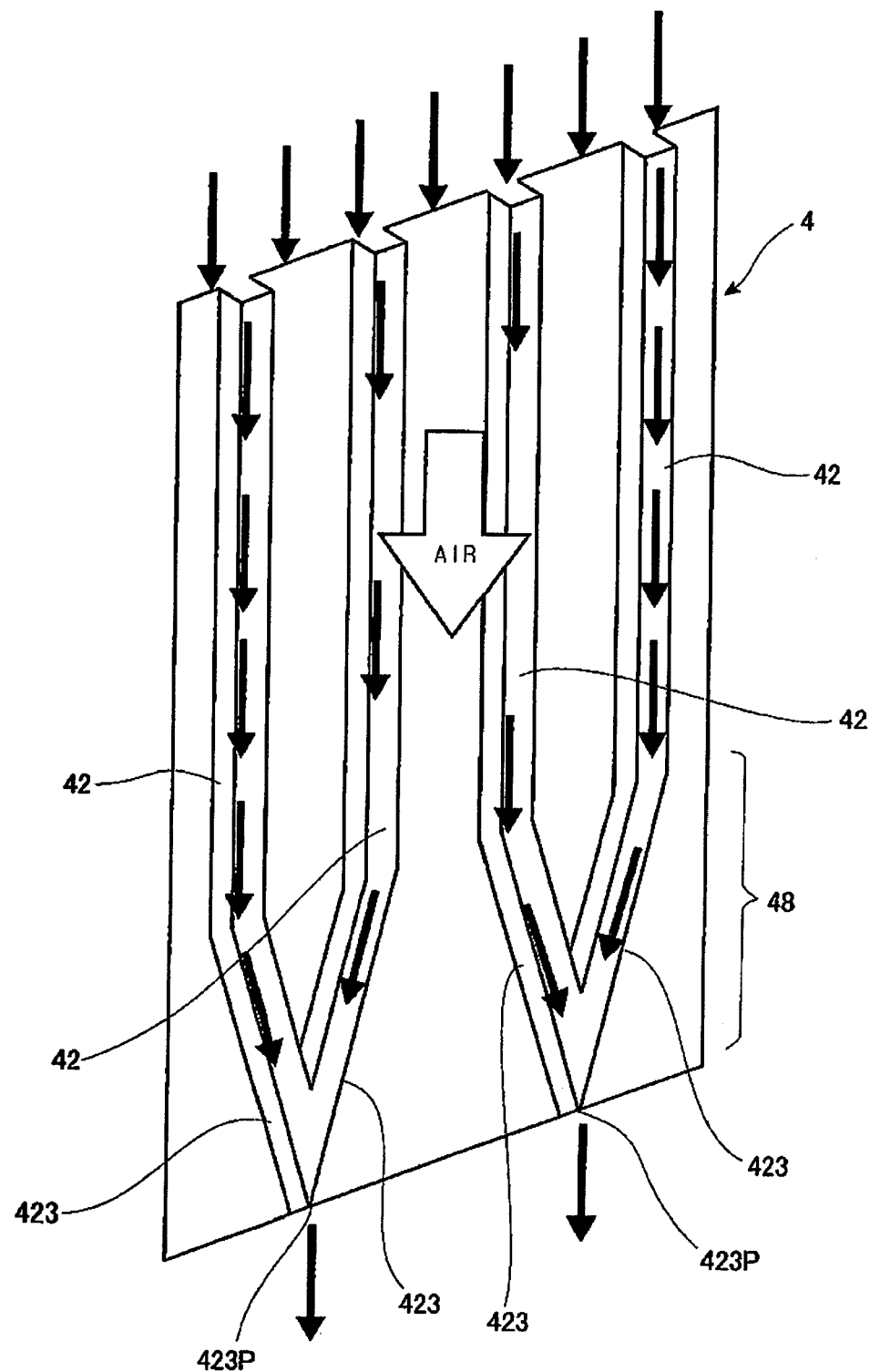
FIG. 13 is an enlarged partial oblique view of a collector member that shows a different structure.

FIG. 13 shows a structure in which the convex portions 42 that are formed on the projecting portions 48 are inclined. In the projecting portions 48, slanting flow channels 423 are formed in which adjacent convex portions 42 gradually converge in the downward direction. The upper ends of the slanting flow channels 423 are continuous with the hollow portions 41, and the lower ends of the slanting flow channels 423 connect in an acute angle shape to form connection points 423P. The water that flows downward in the hollow portions 41 is guided by the slanting flow channels 423 and collects at the connection points 423P. Because water droplets collect at the connection points 423P, the water droplets readily grow in size, which facilitates their discharge by dripping.

Figure 14:
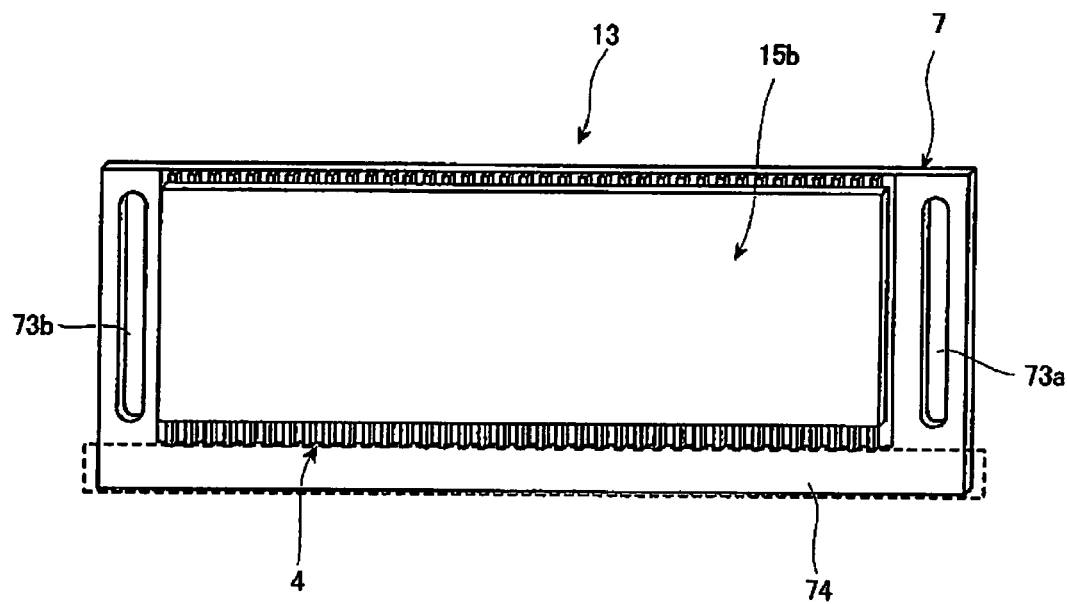
FIG. 14 is an oblique view that shows an overall shape of a separator that shows a different structure.

In FIG. 14, a projecting portion 74 is formed by extending the partition 13s downward. With this structure, it is sufficient to change only the vertical length of the partition 13s, so it has the advantage of low initial cost. A hydrophilicized region and a water-repellent region can be provided on the projecting portion 74 in the same manner as with the projecting portions 48.

Figure 15:
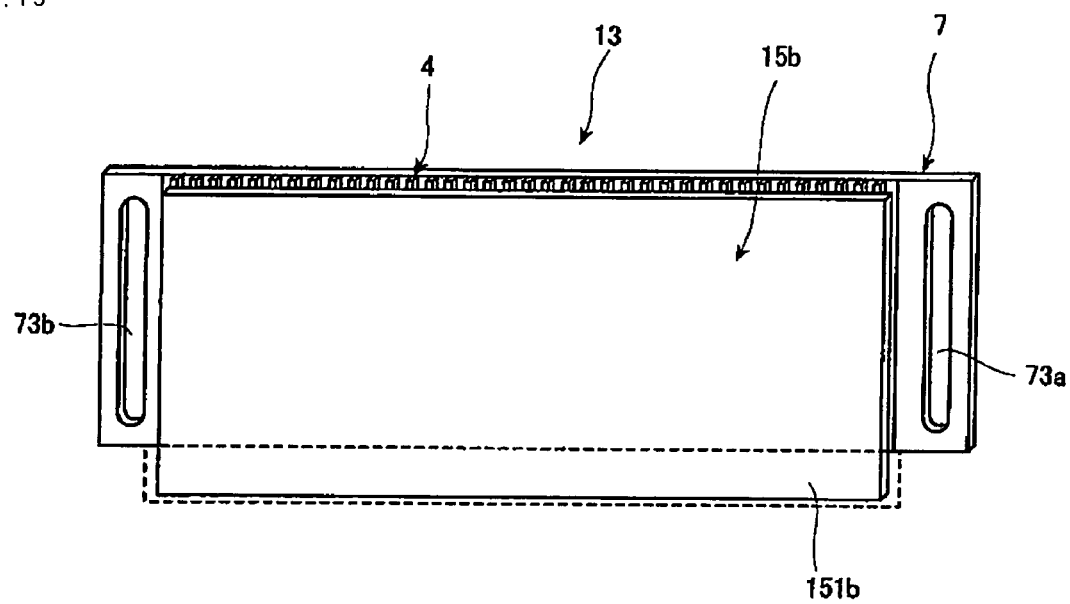
FIG. 15 is an oblique view that shows an overall shape of a separator that shows a different structure.

Also, as shown in FIG. 15, a projecting portion 151b may be formed by downwardly extending a diffusion layer of the oxygen electrode 15b, which is a component of the unit cell 15.

Next, the structure of the fuel cell system that is shown in FIG. 1 will be explained. The structure of the fuel supply system 10 will be explained. The hydrogen storage tank 11, which is a fuel gas cylinder, is connected to a gas intake port of the fuel cell stack 100 through fuel gas supply passages 201A, 201B. In the fuel gas supply passage 201A, a hydrogen source valve 18, a primary pressure sensor S0, a regulator 19, a secondary pressure sensor S1, a first gas supply valve 20, a hydrogen pressure regulation valve 21, a second gas supply valve 22, and a tertiary pressure sensor S2 are provided in that order. The fuel gas supply passage 201A is connected to one end of the fuel gas supply passage 201B. The other end of the fuel gas supply passage 201B is connected to IN of the gas intake port of the fuel cell stack 100. One end of a gas discharge passage 202 is connected to a gas discharge port of the fuel cell stack 100, and the other end of the gas discharge passage 202 is connected to the fuel gas supply passage 201B, forming a fuel gas circulation passage. In the gas discharge passage 202, a trap 24, a circulation pump 25, and a circulation solenoid valve 26 are disposed in that order, starting from the gas discharge port of the fuel cell stack 100. A water level sensor S10 is attached to the trap 24, and the trap 24 is connected to one end of a gas outlet passage 203. The other end of the gas outlet passage 203 is connected to an air duct 124. An exhaust solenoid valve 27 is provided in the gas outlet passage 203.

Next, the air supply system 12 will be explained. The air supply system 12 includes an air intake passage 123, the air manifold 54, and the air duct 124, which is an air discharge passage. In the air intake passage 123, a filter 121, an air fan 122, and the air manifold 54 are provided in that order in the inflow direction.

Within the air intake passage 123, in a position immediately prior to the air manifold 54, a nozzle 55a is provided that injects coolant water in mist form into each of the openings 940. The nozzle 55a may also be provided within the air manifold 54. The air manifold 54 splits the incoming air and causes it to flow to the inlet ports 43 of the fuel cell stack 100.

An exhaust manifold 53A1 is connected to the outlet ports 44 of the fuel cell stack 100. Air that is discharged from the outlet ports 44 is merged into a single flow by the exhaust manifold 53A1 and sent to the air duct 124. Note that a sensor S11, which detects the temperature of the air that is discharged from the outlet ports 44, is provided on the side of the exhaust manifold 53A1 toward the outlet ports 44. Also, the air that is discharged from the outlet ports 44 is discharged after it has made contact with the polymer electrolyte membrane 15a, so detecting the temperature of the discharged air is equivalent to estimating the temperature of the polymer electrolyte membrane 15a.

The air duct 124 channels the air that is discharged from the outlet ports 44 to the outside through a condenser 51. The condenser 51, to which a fan is attached, is provided at the terminal end of the air duct 124 and is connected to a filter 125. The condenser 51 removes water from the air. The condenser 51 also recovers that portion of the water supplied by the nozzle 55a that was vaporized within the fuel cell stack 100. An exhaust temperature sensor S9 is provided in the air duct 124 to detect indirectly the temperature within the fuel cell stack 100.

Next, the water supply system will be explained. The water supply system 50 has a water tank 531, a conducting channel 57, which guides the water recovered by the condenser 51 to the water tank 531, and a water supply passage 56, which guides the water in the water tank 531 to the nozzle 55a. A recovery pump 62 is provided in the conducting channel 57. The recovery pump 62 pumps water that the condenser 51 has removed from the exhaust gas to the water tank 531. A filter 64 and a pump 61a are provided in that order in the water supply passage 56. The pump 61a supplies water to the nozzle 55a, which is a supply unit. A tank water level sensor S7, which is a unit that detects the amount of stored water, is provided in the water tank 531.

The load system 70 is connected to the fuel cell stack 100, and the electric power that is output by the fuel cell stack 100 is supplied to the load system 70. The electrodes of the fuel cell stack 100 are connected to an inverter 73 through wires 71, and the electric power is supplied from the inverter 73 to loads such as a motor and the like. An auxiliary power supply 76 is connected to the inverter 73 through an insulated gate bipolar transistor (IGBT) 75, which is a switch unit. The auxiliary power supply 76 may, for example, be structured from a battery, a capacitor, or the like. A voltage sensor S4, which detects the output voltage of the fuel cell stack 100, and a current sensor S3, which detects the output current of the fuel cell stack 100, are provided in the load system 70.

A detected value from the sensor S11, which detects the temperature of the air that is discharged from the outlet ports 44, is input to a control unit of the fuel cell system 1, in order to estimate the temperature of the polymer electrolyte membrane 15a. The sensors S0 to S4, S7, S9, and S10, the regulator 19, the valves 18, 19, 20, 22, 26, and 27, the pumps 25 and 62, the air fan 122, the fan attached to the condenser 51, the inverter 73, and the IGBT 75 are also connected to the control unit of the fuel cell system 1. Note that an ignition switch not shown in the drawings is also connected to the control unit to input drive and stop command signals for the drive motor that drives the vehicle.

What is claimed is:

1. A fuel cell stack in which unit cells, each of which is made up of an electrolyte layer plus a fuel electrode and an oxygen electrode that are provided on opposite sides of the electrolyte layer, are stacked such that they sandwich a separator to form, between the oxygen electrodes, an oxidizing gas chamber to which a mixed flow of air and water is supplied, wherein
    the oxidizing gas chamber has an inlet port in an upper portion for the mixed flow and an outlet port in a lower portion for the mixed flow;
    the separator has a collector member that is in contact with the oxygen electrode and is in the form of a mesh with openings extending therethrough;
    the collector member forms a plurality of air flow channels with hydrophilic inner wall surfaces; and
    the outlet port has a projecting portion including a hydrophilic upper part which receives water from the hydrophilic inner wall surfaces of the air flow channels and a water repellant lower part beneath the hydrophilic upper part.

2. The fuel cell stack according to claim 1, wherein the projecting portion is formed by extending the collector member downward.

3. The fuel cell stack according to claim 1, wherein the separator further has a collector member that is in contact with the fuel electrode, and a partition that is interposed between the collector members; and
    the projecting portion is formed by extending the partition downward.

4. The fuel cell stack according to claim 1, wherein the projecting portion is formed by extending the oxygen electrode downward.

5. The fuel cell stack according to claim 1, wherein the projecting portion has a slanting portion in which a lower edge of the projecting portion is slanted.

6. The fuel cell stack according to claim 2, wherein the projecting portion has a slanting portion in which a lower edge of the projecting portion is slanted.

7. The fuel cell stack according to claim 3, wherein the projecting portion has a slanting portion in which a lower edge of the projecting portion is slanted.

8. The fuel cell stack according to claim 4, wherein the projecting portion has a slanting portion in which a lower edge of the projecting portion is slanted.

9. The fuel cell stack according to claim 1 including a plurality of frames, each frame accommodating a unit cell therein, and wherein a lower end of the collector member extends from the unit cell downward beyond the frame to form the projecting portion.

10. The fuel cell stack according to claim 1 wherein each unit cell further includes a collector member in contact with the fuel electrode, a partition that is interposed between the collector members and a frame accommodating the unit cell therein, and wherein a lower end of the partition extends from the unit cell downward beyond the frame to form the projecting portion.

11. The fuel cell stack according to claim 1 including a plurality of frames, each frame accommodating a unit cell therein, and wherein a lower end of the oxygen electrode extends from the unit cell downward beyond the frame to form the projecting portion.

* * * * *